US012625836B2

(12) United States Patent
Nikuie et al.

(10) Patent No.: US 12,625,836 B2
(45) Date of Patent: May 12, 2026

(54) SYSTEM AND METHOD FOR FLEXIBLY CROSSING PACKETS OF DIFFERENT PROTOCOLS

(71) Applicant: Microchip Technology Incorporated, Chandler, AZ (US)

(72) Inventors: Nima Nikuie, San Francisco, CA (US); Lijish Remani Bal, Port Coquitlam (CA)

(73) Assignee: Microchip Technology Incorporated, Chandler, AZ (US)

( * ) Notice: Subject to any disclaimer, the term of this patent is extended or adjusted under 35 U.S.C. 154(b) by 140 days.

(21) Appl. No.: 18/780,872

(22) Filed: Jul. 23, 2024

(65) Prior Publication Data

US 2024/0378168 A1 Nov. 14, 2024

Related U.S. Application Data

(63) Continuation of application No. 17/973,894, filed on Oct. 26, 2022, now Pat. No. 12,072,829.

(60) Provisional application No. 63/273,199, filed on Oct. 29, 2021.

(51) Int. Cl.
*G06F 13/42* (2006.01)
*G06F 9/448* (2018.01)

(52) U.S. Cl.
CPC ........ *G06F 13/4226* (2013.01); *G06F 9/4498* (2018.02); *G06F 2213/0026* (2013.01)

(58) Field of Classification Search
CPC .. G06F 13/42; G06F 13/4221; G06F 13/5226; G06F 13/423; G06F 13/4226; G06F 13/4256; G06F 13/426
See application file for complete search history.

(56) References Cited

U.S. PATENT DOCUMENTS

| | | | |
|---|---|---|---|
| 6,640,275 B1 | 10/2003 | Kincaid et al. | 710/305 |
| 7,023,879 B1 | 4/2006 | Sitaraman et al. | 370/466 |
| 7,096,375 B2 | 8/2006 | Wakayama et al. | 713/400 |
| 7,099,355 B1 | 8/2006 | Johnson et al. | 370/535 |
| 7,492,760 B1 | 2/2009 | Plante et al. | 370/363 |
| 7,773,608 B2 | 8/2010 | Miles et al. | 370/400 |

(Continued)

OTHER PUBLICATIONS

International Search Report and Written Opinion, Application No. PCT/US2022/048222, 12 pages.

*Primary Examiner* — Raymond N Phan

(74) *Attorney, Agent, or Firm* — SLAYDEN GRUBERT BEARD PLLC

(57) ABSTRACT

An apparatus and method coupling a first and a second data bus comprising selectors for routing first bus egress lanes to egress memories, each egress memory coupled to one second bus egress lane, where the second bus has more egress lanes than the first. Each egress memory corresponds to one second bus egress lane. A first FSM selecting which first bus egress lane to load into each egress memory synchronous with the first bus clock. A second FSM outputting egress memory values to the second bus synchronous with the second bus clock. A set of ingress memories, each memory coupled to one second bus ingress lane and to an input of each ingress selector. A third FSM loading the ingress memories synchronous with the second bus clock. A fourth FSM selecting which ingress memory to route to each first bus ingress lane synchronous with the first bus clock.

17 Claims, 5 Drawing Sheets

(56)     References Cited

U.S. PATENT DOCUMENTS

| 8,006,021 | B1 | 8/2011 | Li et al. | .................... 710/306 |
| 2018/0300271 | A1 | 10/2018 | Choe | |
| 2020/0257647 | A1 | 8/2020 | Ringe et al. | |
| 2021/0311895 | A1* | 10/2021 | Das Sharma | ....... G06F 13/4221 |

* cited by examiner

300

SYSTEM AND METHOD FOR FLEXIBLY CROSSING PACKETS OF DIFFERENT PROTOCOLS

RELATED APPLICATIONS

This application is a continuation of U.S. application Ser. No. 17/973,894 filed on Oct. 26, 2022, which claims priority to commonly owned U.S. Provisional Patent Application No. 63/273,199 filed Oct. 29, 2021, the entire contents of which applications are hereby incorporated by reference for all purposes.

FIELD OF THE INVENTION

The present application relates to systems and methods for transferring packets between two computer busses.

BACKGROUND

Computing systems may interface with busses of different protocols and bus sizes to accommodate design choices and available components. The two different busses may not be directly compatible as they may have different timing, protocols, and bus widths, without limitation. There is a need to translate packets from one bus into packets on a second bus. Further, there is a need to reduce gate count and complexity. One approach might utilize a dual-port random access memory (RAM) for each direction in conjunction with sets of registers/flops and barrel shifters. This approach is complex and incorporates far more gates than required in the presently disclosed approach.

SUMMARY

Examples of the present disclosure include an apparatus for coupling a first and a second data bus. The first bus interface has a first number of egress lanes and a first number of ingress lanes wherein the first number of egress lanes is less than the first number of ingress lanes. The second bus interface has a second number of egress lanes and a second number of ingress lanes. A plurality of egress selectors each has an output coupled to an input of one of a plurality of egress memories and each egress selector has a plurality of inputs coupled to the first bus interfaces ingress lanes wherein each egress selector may select any one of the first bus ingress lanes to output to the input of the corresponding egress memory. Each egress memory has an output coupled to one of the second bus egress lanes, a read enable input coupled to a first finite state machine synchronized to a first clock, and a write enable input coupled to a second finite state machine synchronized to a second clock. A plurality of ingress selectors each has an output coupled to one of the first bus ingress lanes and each ingress selector having a plurality of inputs coupled to the ingress memories wherein each ingress selector may select the output of any one of the ingress memories to output to the corresponding first bus ingress lane. Each ingress memory has an input coupled to one of the second bus ingress lanes, a write enable input coupled to a third finite state machine synchronized to the second clock, and a read enable input coupled to a fourth finite state machine synchronized to the first clock. The first finite state machine controls a select input of each of the egress selectors and the fourth finite state machine controls a select input of each of the ingress selectors. In some examples, the first bus interface is a 10 lane Peripheral Component Interconnect Express (PCIe) bus interface and the second bus interface is a 16 lane Advanced extensible Interface (AXI) bus interface. In some examples, the first finite state machine selects data from a first lane of the PCIe bus interface for delivery to the tenth egress memory destined for the tenth lane of the AXI bus. In some examples, the first bus interface includes 10 egress lanes and 10 ingress lanes. In some examples, the fourth finite state machine selects the first of the egress memories in one data transfer on the first bus ingress lanes and selects the other seven ingress memories in the next data transfer on the first bus ingress lanes. In some examples, each of the ingress and egress memories is a strip of RAM memory. In some examples, the apparatus includes an ingress descriptor memory to store packet information for ingress bus transactions, the packet information comprising an indication of which of the ingress memories contains valid data associated with a corresponding packet. In some examples, the fourth finite state machine tracks which of the ingress memories has data remaining to be transferred.

Examples of the present disclosure include a method comprising at a first time synchronized with a first bus clock, receiving an array of data units of a first egress packet from a plurality of egress lanes of a first bus, storing received data units of the array of data units in a respective one of a plurality of egress memories, and writing a first descriptor to an egress descriptor memory, the descriptor including an identification of valid data units in the received packet. The method includes, at a second time synchronized with a second bus clock, reading the first descriptor from the egress descriptor memory, and for each valid data unit identified in the first descriptor, asserting a read enable on the corresponding egress memory to output the data unit to a corresponding one of a plurality of egress lanes of a second bus. In some examples the method includes, at a third time synchronized with the second bus clock, receiving a second array of data units of a first ingress packet from a plurality of ingress lanes of the second bus, storing received data units of the second array of data units in respective ones of a plurality of ingress memories, and writing a second descriptor to an ingress descriptor memory, the second descriptor including an identification of valid data units in the received first ingress packet. The method includes, at a fourth time synchronized with the first bus clock, reading the second descriptor from the ingress descriptor memory, selecting a subset of the ingress memories to output data to corresponding lanes of the first bus, and for each valid data unit identified in the second descriptor and stored in an ingress memory in the subset, asserting a read enable on the corresponding ingress memory. In some examples, the method includes, at a fifth time synchronized with the first bus clock, selecting a different subset of the ingress memories to output data to corresponding ingress lanes of the first bus, and for each valid data unit identified in the second descriptor and stored in an ingress memory in the second subset, asserting a read enable on the corresponding ingress memory. In some examples, the method includes, at an intervening time between the third and fourth times and synchronized with the second bus clock, writing an egress header to the second bus. In some examples, the first bus has a 10 lane bus interface, the set of egress memories comprises 16 memories, the second bus has a 16 lane bus interface, and the set of ingress memories comprises 16 memories, and at the fourth time, the subset of ingress memories consists of the first nine of the ingress memories; and at the fifth time, the different subset of ingress memories comprises the tenth through the sixteenth ingress memories. In some examples, each of the ingress and egress memories is a strip of RAM memory.

Examples of the present disclosure include a non-transitory computer-readable medium comprising register transfer level (RTL) to, at a first time synchronized with a first bus clock, receive an array of data units of a first egress packet from a plurality of egress lanes of a first bus, store received data units of the array of data units in a respective one of a plurality of egress memories, and write a first descriptor to an egress descriptor memory, the descriptor including an identification of valid data units in the received packet. The RTL to, at a second time synchronized with a second bus clock, read the first descriptor from the egress descriptor memory, and for each valid data unit identified in the first descriptor, assert a read enable on the corresponding egress memory to output the data unit to a corresponding one of a plurality of egress lanes of a second bus. In some examples, the medium includes RTL code to, at a third time synchronized with the second bus clock, receive a second array of data units of a first ingress packet from a plurality of ingress lanes of the second bus, store received data units of the second array of data units in respective ones of a plurality of ingress memories, and write a second descriptor to an ingress descriptor memory, the second descriptor including an identification of valid data units in the received first ingress packet. The medium includes RTL code to, at a fourth time synchronized with the first bus clock, read the second descriptor from the ingress descriptor memory, select a subset of the ingress memories to output data to corresponding lanes of the first bus, and for each valid data unit identified in the second descriptor and stored in an ingress memory in the subset, assert a read enable on the corresponding ingress memory. In some examples, the medium includes RTL code to, at a fifth time synchronized with the first bus clock, select a different subset of the ingress memories to output data to corresponding ingress lanes of the first bus, and for each valid data unit identified in the second descriptor and stored in an ingress memory in the second subset, assert a read enable on the corresponding ingress memory. In some examples the medium includes RTL code to, at an intervening time between the third and fourth times and synchronized with the first bus clock, write an egress header packet to the first bus. In some examples, the first bus has a 10 lane bus interface, the set of egress memories comprises 16 memories, the second bus has a 16 lane bus interface, and the set of ingress memories comprises 16 memories, and wherein at the fourth time, the subset of ingress memories consists of the first nine of the ingress memories; and at the fifth time, the different subset of ingress memories comprises the tenth through the sixteenth ingress memories. In some examples, each of the first and second bus memories is a strip of RAM memory.

DETAILED DESCRIPTION

The present disclosure provides circuits for passing information between two different data bus architectures. For example, system designers may wish to have one interface for accessing a preexisting set of input/output (I/O) devices and a memory interface for accessing one or more random access memory (RAM) devices. Further, the system designer may wish to have data cross directly between the two busses to allow a processor core having only the I/O bus interface type to also communicate with a RAM device having only the memory bus interface. A system designer may use the present disclosure to transfer information between two different bus architectures.

Figure 1:
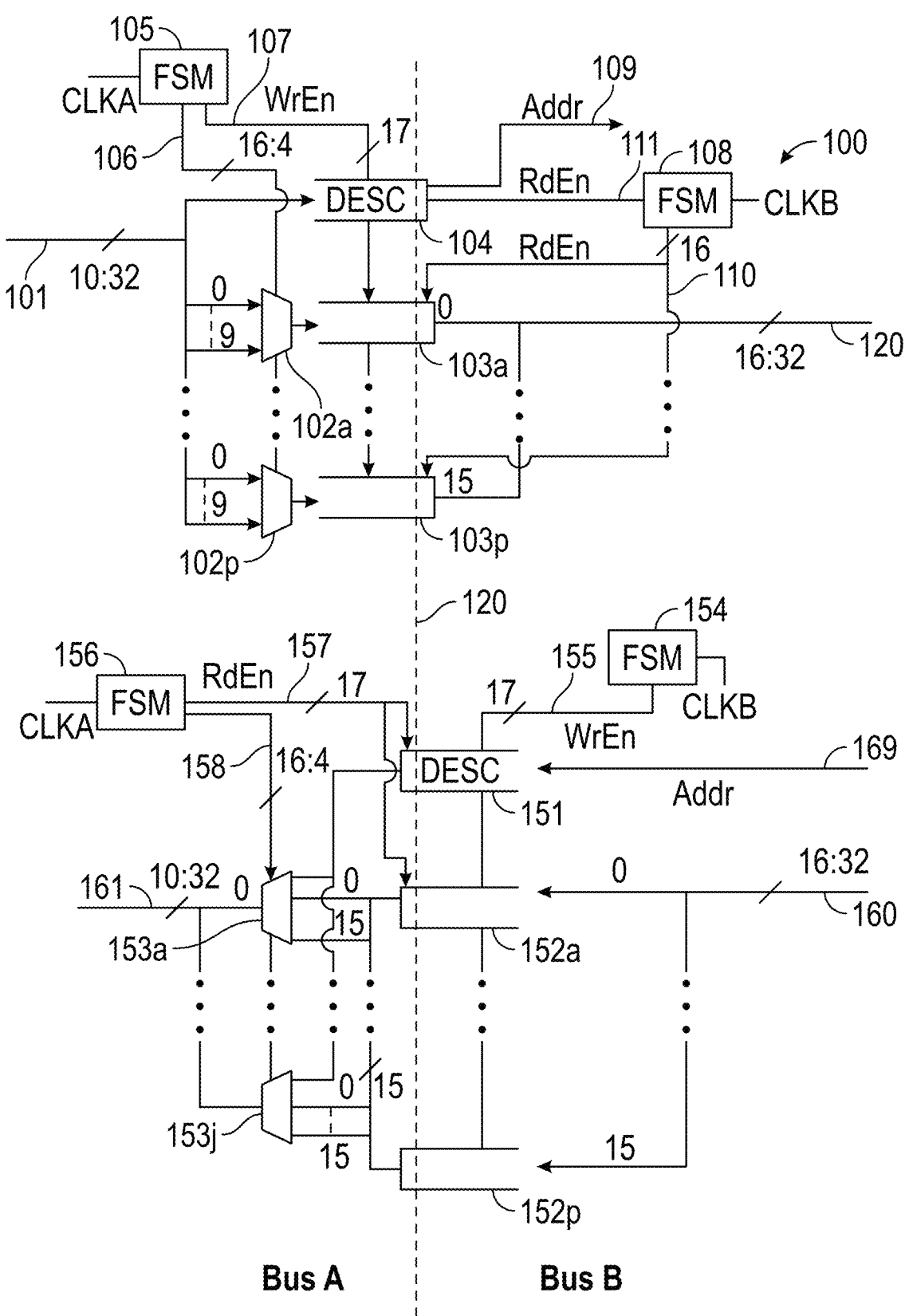
FIG. 1 is an illustration of a system for crossing packets between two busses according to certain examples of the present disclosure.

FIG. 1 is an illustration of an apparatus for coupling a first and a second data bus according to certain examples of the present disclosure. System 100 is illustrated as two halves, a first bus, denoted Bus A on the left, and a second bus, denoted Bus B on the right. In some examples, the Bus A side is connected to egress lines 101 of Peripheral Component Interconnect Express (PCIe) Bus A (and ingress lines 161 of PCIe Bus A) having ten lanes, each lane carrying a double word (or, dword) (e.g., 10 sets of 32 lines or "10:32") for a total of 320 bits. Bus A transfers are synchronized with CLKA while Bus B transfers are synchronized with CLKB. The dashed vertical line illustrates this timing boundary. Some examples of system 100 are designed to function when CLKA is not synchronized with CLKB. In some examples, the Bus B side is connected to egress lines 120 of Advanced extensible Interface (AXI) Bus B (and ingress lines 160) having sixteen lanes, each lane one dword wide (e.g., 16 sets of 32 lines or "16:32") for a total of 512 bits. PCIe is defined by the PCI Special Interest Group of Beaverton, Oregon and AXI is defined by ARM Ltd. Of Cambridge, United Kingdom. This disclosure refers to egress communications as originating on the Bus A side and flowing through the top portion of FIG. 1 and ingress communications as originating on the Bus B side and flowing the reverse direction through the bottom portion of FIG. 1. These directions are labeled for convenience and may not correspond to internal/external data flows.

The egress portion of system 100 comprises finite state machine (FSM) 105, FSM 108, descriptor memory 104, egress multiplexers 102a-102p (i.e., "muxes" or selectors), and egress memories 103a-103b. Muxes 102a-102p respectively pass one of ten data units on bus 101, e.g., one of ten doublewords or dwords, to a corresponding one of memory 103a-103p. References to dwords should be understood as nonlimiting. Each of memories 103a-130p may respectively be a RAM strip with read and write enable lines. A RAM strip may be an independent piece of random-access memory having its own read/write ports and a smallest unit of data storage defined, in some examples, as 32 bits corresponding to the dword unit of transfer on Bus A and Bus B. Each corresponding memory 103 may have storage for a predetermined number of data units. In some examples, a corresponding memory 103 may have storage for sixty-four dwords. Respective memories 103 Each memory 103 has a read port coupled to a dword portion of bus 120 to allow the combined set of memories 103a-103p to present up to a full 512 bits of data on bus 120 in a single bus transaction. Egress portion of system 100 also comprises egress descriptor memory 104, which may be a RAM strip with read and write enable lines. Egress descriptor memory 104 may store header information read from bus 101 as well as information derived from finite state machine (FSM) 105 indicating valid information in memories 103*a*-103*p*. Egress descriptor memory 104 is coupled to address lines 109 of bus 120. Egress portion of system 100 also comprises finite state machine 105, which drives select lines 106 of muxes 102*a*-102*p* and write enable lines 107 of memories 103*a*-103*p*. FSM 105 receives clock signal CLKA and thereby operates in sync with Bus A by operating on CLKA. Egress portion of system 100 also comprises FSM 108, which drives read enable lines 110 for memories 103*a*-103*p* and read enable line 111 for descriptor memory 104. FSM 108 receives clock signal CLKB and thereby operates in sync with Bus B. In some examples, FSM 105 may write to descriptor memory 104 before all valid dwords have been written to memories 103*a*-*p* but must still signal FSM 108 once the valid dwords have been written. In some examples, FSM may update one or more bits in descriptor memory 104 once all the valid dwords have been written. In other examples, FSM 105 may assert a valid signal by updating the descriptor record in descriptor memory 104 to notify FSM 108 that a data transfer request has been fully queued.

The ingress portion of system 100 includes descriptor memory 151, ingress memories 152*a*-152*p*, FSM 154, FSM 156, and muxes 153*a*-153*j*. Descriptor memory is coupled to address lines 109 of Bus B. Each of ingress memories 152*a*-152*p* is coupled to a corresponding dword portion of Bus B. FSM 154 receives clock signal CLKB and thereby operates in sync with Bus B. FSM 154 drives write enable lines 155 of ingress descriptor memory 151 and ingress memories 152*a*-152*p*. Respective muxes 153*a*-153*j* output data to a corresponding dword portion of bus 161. Each mux 153 may select information from ingress descriptor memory 151 or any one of ingress memories 152*a*-152*p*. FSM 156 receives clock signal CLKA and thereby operates in sync with Bus A. FSM 156 drives select lines on each mux 153 and a read enable line for each of ingress descriptor memory 151 and ingress memories 152*a*-152*p*. In some examples, FSM 154 may write to descriptor memory 151 before all valid dwords have been written to memories 152*a*-152*p* but must still signal FSM 156 once the valid dwords have been written. In some examples, FSM may update one or more bits in descriptor memory 151 once all the valid dwords have been written. In other examples, FSM 154 may assert a valid signal to notify FSM 156 that a data transfer request has been fully queued.

In an example, the first 10 dwords of a PCIe packet arrive on egress lines 101. FSM 105 selects the input to mux 120*z* corresponding to the portion of egress lines 101 representing the header portion of the PCIe packet. This will direct the header to descriptor memory 104. If the PCIe packet has no optional prefixes, this will be the first dword (e.g., index zero) on line 101. FSM 105 selects the remaining dwords (index 1 through index 9) to transfer the nine data dwords on lines 101 into memories 103*a* through 103*i* (the first nine memories). FSM 105 also asserts write enable lines 107 to store the header and first nine dwords of data into memories 104 and 103*a*-*i*. In this example, the next bus transaction on egress bus lines 101 includes ten dwords of data. FSM 105 selects the first (index zero) dword to transfer to memory 103*j* (the tenth memory), the second dword to transfer to memory 103*k*, and so on until the seventh dword is selected for memory 103*p*. FSM 105 asserts write enable lines on memories 103*j*-103*p* to store the data across all available memories 103 associated with a single future bus transaction on lines 120. Once an entire egress packet has been stored in memories 103, FSM 105 signals FSM 108 that a valid packet has been captured, for example, by setting a value in descriptor memory 105. In some examples, header information may be gathered in a temporary memory and then written to descriptor memory 105 (or 151) only after the payload of the egress packet has been captured in memories 103. In such an example, a non-empty record in descriptor memory 105 (or 151) indicates a valid packet has been received.

In another example, the first 16 dwords of an AXI packet arrive (synchronized with CLKB) on ingress lines 160 concurrently with address information on address lines 169. FSM 154 asserts write enable lines to load values into descriptor memory 151 and each ingress memory 152*a*-152*p*. At some later time, FSM 156 asserts select lines on ingress multiplexer 153*a* to route a descriptor record from descriptor memory 151 to the first lane of Bus A ingress lines 161. FSM 156 also asserts select lines on the remaining ingress multiplexers 153*b*-153*j* to route dwords from the first nine ingress memories (e.g., 152*a*-152*i*) to Bus A ingress lanes 1 through 9, respectively. FSM 156 then asserts read enable lines on the descriptor memories and ingress memories 152*a*-152*i*. In the next bus transaction on the ingress lines of Bus A, FSM 156 routes dwords starting with the ingress memory (e.g., 152*j*) routed to the first ingress lane of Bus A.

Figure 2:
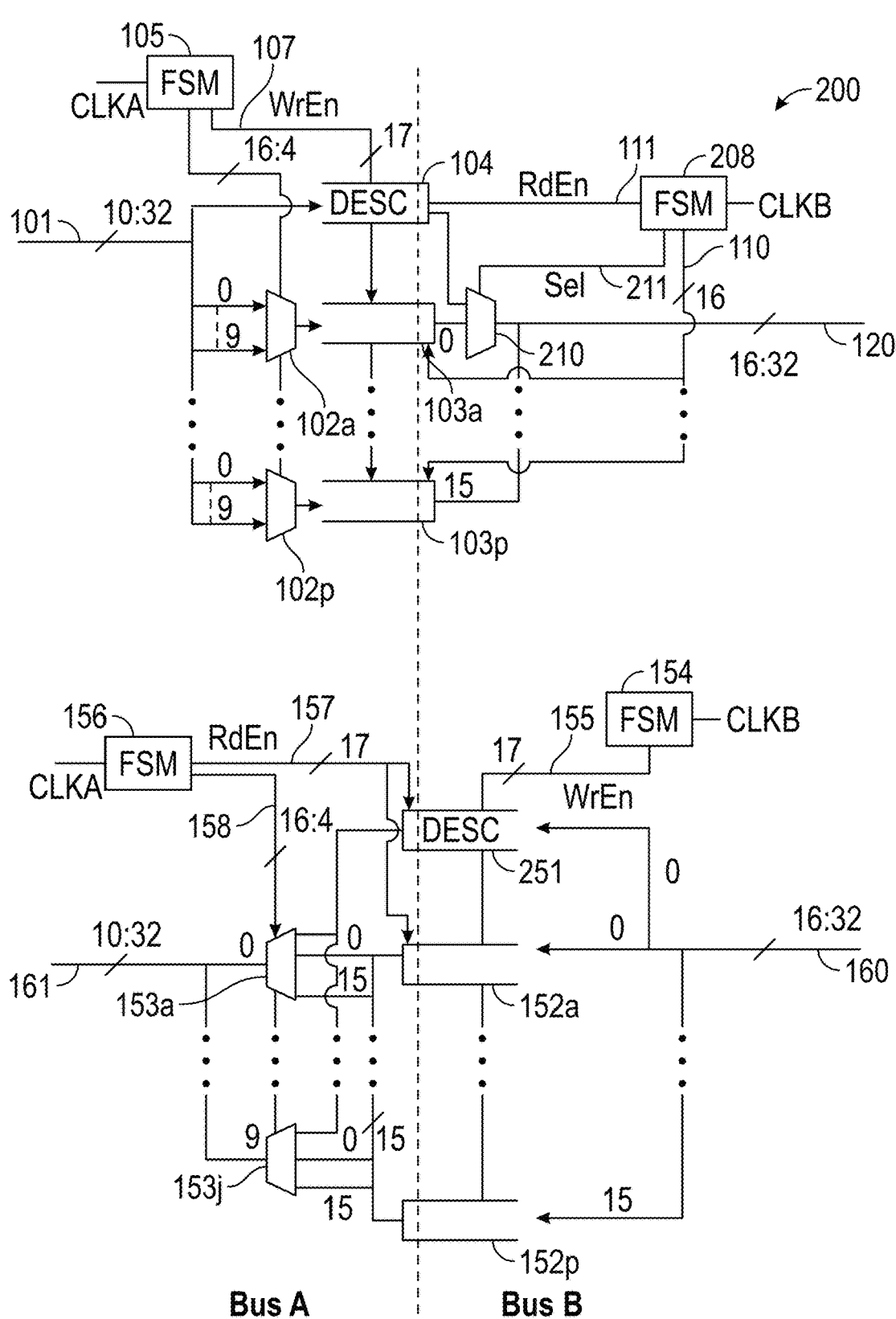
FIG. 2 is an illustration of another system for crossing packets between two busses according to certain examples of the present disclosure.

FIG. 2 is an illustration of another system for crossing packets between two busses according to certain examples of the present disclosure. System 200 comprises many of the same components of system 100, which are labeled the same as in system 100. In system 200, Bus B utilizes in-band signaling and does not have separate address lines. System 200 includes one or more additional mux(es) 210 for passing header information from egress descriptor memory 104 to dword portion(s) of bus 120. FSM 208, which receives clock signal CLKB, drives read enable lines 110 and 111 as well as mux selection line(s) 211 for additional mux(es) 210. Ingress portion of system 200 includes ingress descriptor memory 251, which is coupled to one or more dword portions of bus 160 that carry header information. In some examples, bus 160 may be a PCIe bus and header information may include TLP prefixes and TLP header spanning the first two dwords (e.g., bytes 0-7) on bus 160.

Figure 3:
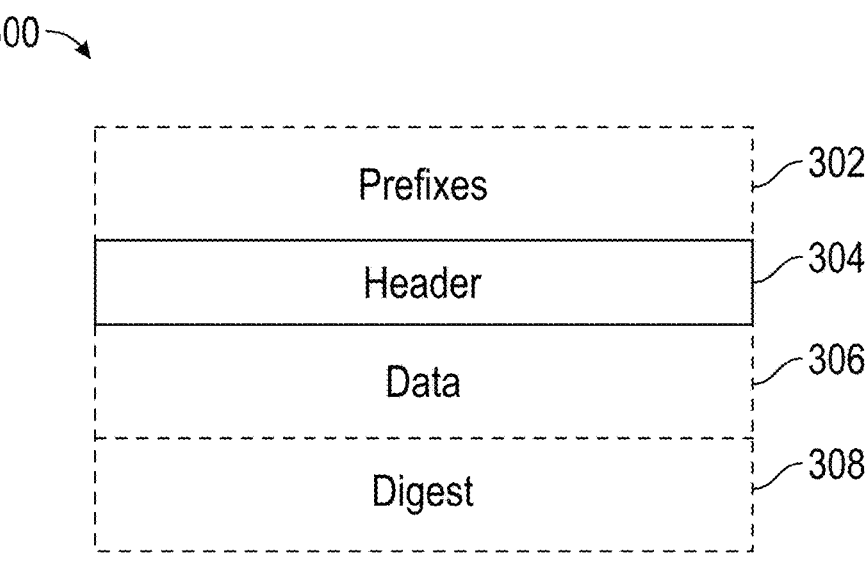
FIG. 3 is an illustration of a TLP packet of a PCIee bus according to certain examples of the present disclosure.

FIG. 3 is an illustration of a TLP packet of a PCIe bus according to certain examples of the present disclosure. Packet 300 may comprise prefixes 302, header 304, data 306, and digest 308. Prefixes 302, if present, may include processing hints or vendor-specific information. Header 304 may include type information, an address (optional), a message (optional). One example of packet 300 is a memory read request in which header 304 may include a read requestor identifier, a read length, and a starting address. Another example of packet 300 is a message without data in which header 304 may include a requestor identifier and a message code. Another example of packet 300 is a write request in which header 304 may include a requester ID, a length, and a starting address and in which data 306 may include data to be written. The entirety of packet 300 (including address and data information) may be transferred over the same bus lines. In some examples, the header format and contents may differ between Bus A and Bus B. In some examples, logic or software instructions executing on a CPU may provide a default value for a missing field, may transform the format of a field, or may derive a value for the target bus header based on information contained in the source bus header.

Figure 4:
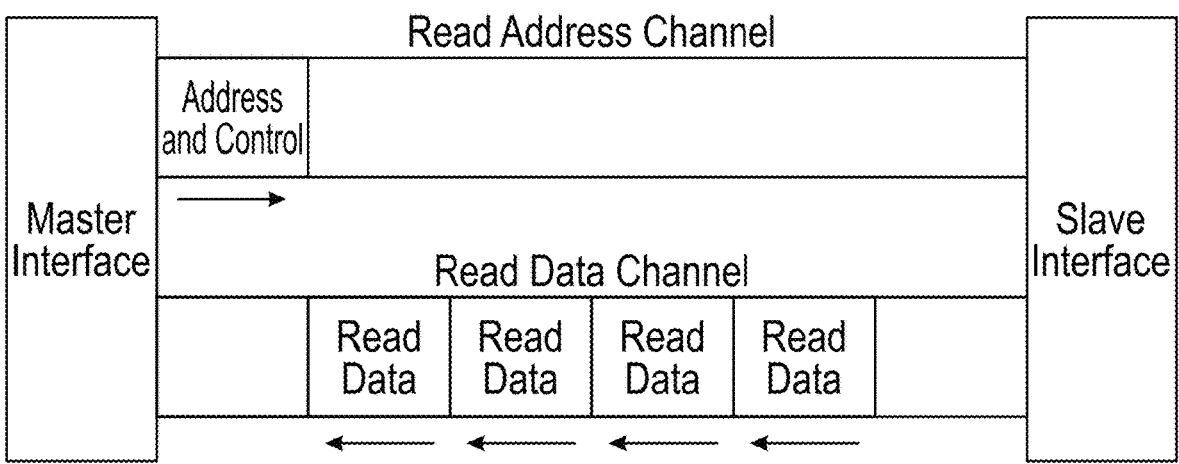
FIG. 4 is an illustration of a AXI bus architecture according to certain examples of the present disclosure.

FIG. 4 is an illustration of a portion of an AXI bus according to certain examples of the present disclosure. The AXI bus architecture relies on dedicated address and control lines. Requests may be issued by the manager interface on the read address channel by providing an address and control message which may include a starting address and a read length. A functional component (e.g., a memory) having a subordinate interface act on a read request by returning the requested data in a series of read data messages transferred over the read data channel. An AXI bus may also include a write address channel, a write data channel, and a write response channel. In some examples, system 100 may be the master interface. In other examples, system 100 may be the subordinate interface.

Figure 5:
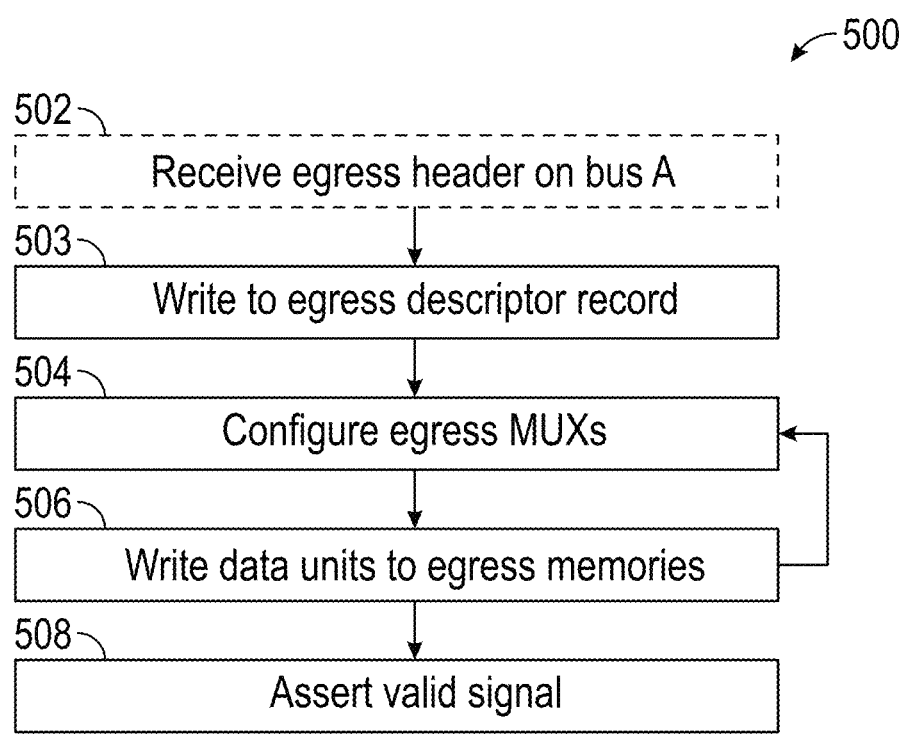
FIG. 5 is a flowchart of a method for crossing packets between two busses according to certain examples of the present disclosure.
Figure 5:
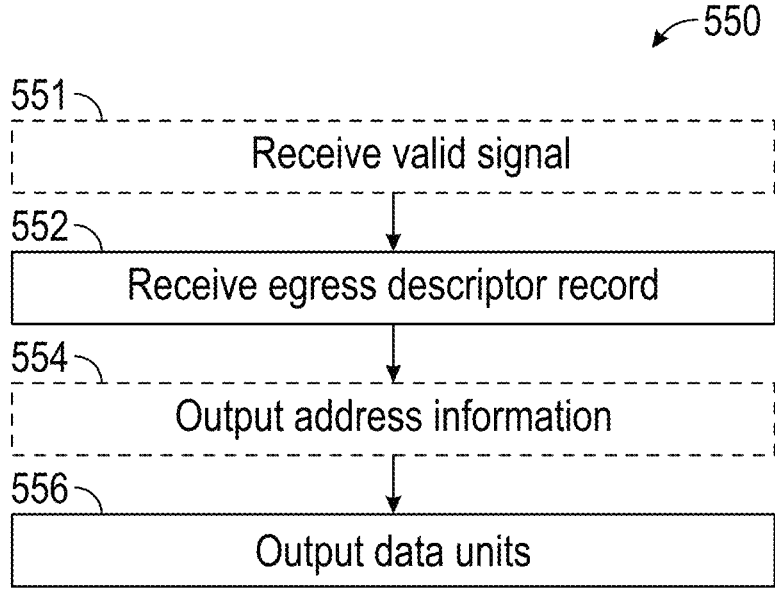

FIG. 5 is a flowchart of a method for crossing packets between two busses according to certain examples of the present disclosure. Process flow 500 stores egress packets from bus A to be forwarded by process flow 550 to bus B.

At block 502, in some examples, the first egress packet of a data transfer has arrived on bus A destined for bus B. The first egress packet arrives at a time synchronized with CLKA. FSM 105 reads header information from the egress packet to determine the destination address and the number of valid data units (e.g., dwords) in the packet. In other examples, block 502 may be omitted if header information may be inferred, for example, if bus transactions are of a constant size. In some examples, block 502 may be omitted if header information is encoded in the data stream without separate address signals. At block 503, FSM 105 writes a descriptor record to egress descriptor memory 104. This descriptor record provides information required to populate any address/control information (or header information) on bus B and provides information on what data units (e.g., dwords), if any, will be arriving in this packet on Bus A destined for Bus B. At block 504, FSM 105 configures the egress muxes 102a-102p to align valid data units with egress memories 103a-103p. In some examples, FSM 105 may sequence its steps to load Each bus transaction from Bus A into a single bus transaction on Bus B. Because Bus B is wider, this will result in unused bandwidth on Bus B. In some examples, FSM 105 may use a current memory counter to pack data units more compactly in memories 102a-102p, e.g., by striping data from Bus A transactions across the additional lanes in Bus B. In these striping examples, a burst transfer may result in a series of packets arriving on bus A targeting the same address on bus B. FSM 105 may read two dwords of header information in the first packet and direct the next eight dwords through egress muxes 102a-102h to memories 103a-103h. In the next Bus A cycle, FSM 105 may repeat blocks 504 through 506 by selecting the first eight dwords from bus A to load into memories 103i-103p and the remaining two dwords from bus A to load into memories 103a-103b. The first eight dwords will fill out a full bus-width line across memories 103a-103p in one transaction on Bus B and the remaining two dwords will be part of a second transaction on Bus B that may also include dwords from a third transaction on Bus A. At block 508, FSM 105 has processed the last data of the data transfer request and updates the outbound descriptor record to signal a valid packet is ready to be read by FSM 108. In some examples, the descriptor is written last, thus step 503 occurs at the time of 508 and the write of the descriptor record into DESC 104 (or 151) provides the signal to FSM 108 (or 156) that a packet from Bus A is queued.

At block 551, FSM 108 receives the valid signal from FSM 105 and begins to process the data transfer. In some examples, the valid signal is an indicator on a descriptor record from egress descriptor memory. In other examples, the valid signal is the presence of a descriptor record in that memory and the process begins at block 552. At block 552, FSM 108 reads a descriptor record from egress descriptor memory 104. At block 554, FSM 108 asserts read enable line 111 on outbound descriptor memory 104 to drive address lines 109 so as to enable output of address information FSM 108. In some examples, block 554 may be omitted, for example, if address information may be inferred or is encoded in the data stream. At block 556, FSM enables one or more read enable lines 110 to drive data from memories 103a-103p onto bus B. Blocks 552, 554, and 556 may be repeated until the entire data transfer has been output to bus 120.

Figure 6:
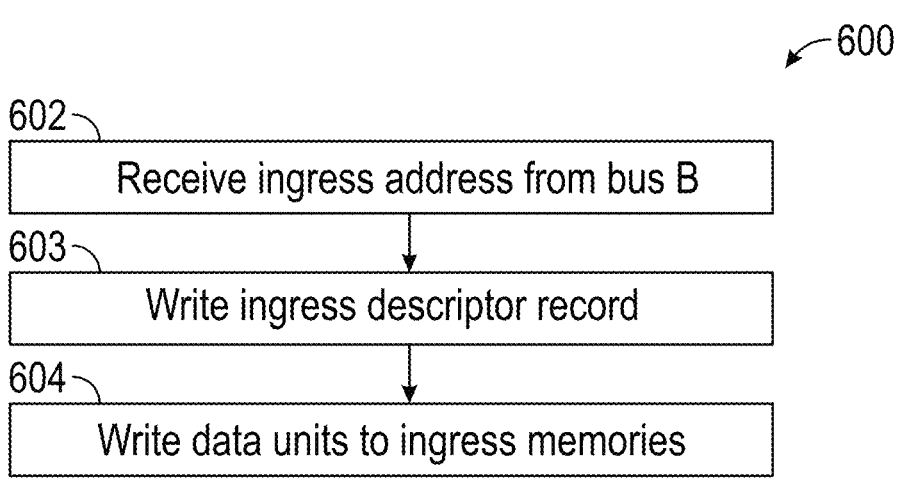
FIG. 6 is a flowchart of a method for crossing packets between two busses according to certain examples of the present disclosure.
Figure 6:
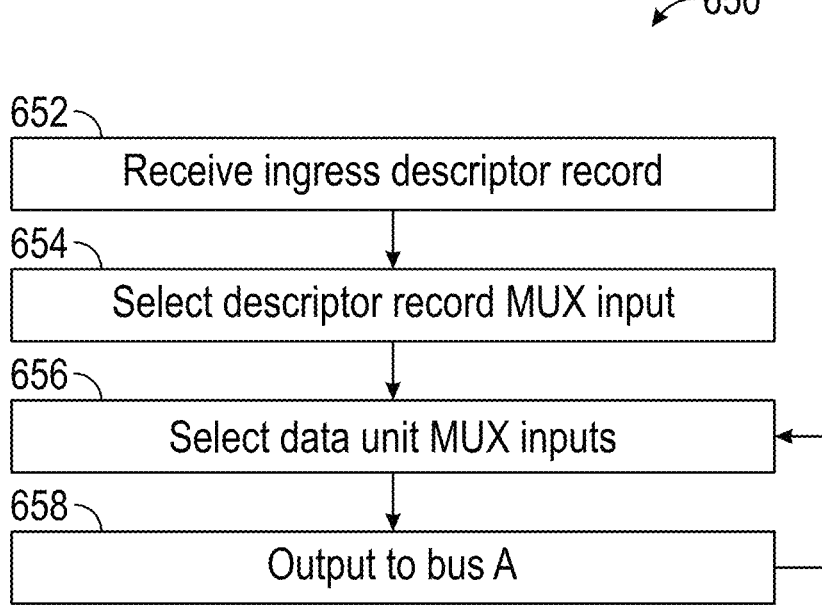

FIG. 6 is a flowchart of a method for crossing packets between two busses according to certain examples of the present disclosure. Process flow 600 stores ingress packets from bus B to be forwarded by process flow 650 to bus A. At block 602, at a time synchronous with CLKB, FSM 154 receives ingress address information on bus B and determines which data units on bus A are valid. At block 603, FSM 154 asserts write enable line 155 coupled to descriptor memory 151 to load address/control information into descriptor memory 151. At block 604, FSM 154 selectively asserts write enable lines 155 coupled to ingress memories 152a-152p to load valid data units into respective ones of ingress memories 152a-152p. Blocks 602 through 604 may be repeated until an entire data transfer has been captured. At block 606, FSM 154 asserts a valid signal to be read by FSM 156. As described above with respect to FIG. 5, a valid signal may be a field on an ingress descriptor record or may be the presence of a complete ingress descriptor record.

At block 651, FSM 156 receives a valid signal asserted by FMS 154. If the valid signal is the presence of a complete ingress descriptor record, this process may start at block 652. At block 652, FSM 156 receives an ingress descriptor record from descriptor memory 151. At step 654, FSM 156 sets one or more ingress muxes 153 to select portions of the ingress descriptor from descriptor memory 151 to pass to Bus A, e.g., to pass header information to Bus A. In some examples, TLP/header information may span more than one dword of Bus A. At block 656, FSM 156 selects data unit mux inputs 153 to pass zero or more data units from egress memories 152a-152p through to bus A. For example, FSM 156 may pass dwords from memories 152a-152h to bus A. At block 658, FSM 156 asserts read enable lines 157 to output data to bus A. If the descriptor record indicates additional data to be transferred, block 656 may be repeated. For example, FSM 156 may select dwords from memories 152i-152p to the first eight dwords of bus A and dwords from memories 152a and 152b to pass to the remaining to dwords of bus A. Blocks 656-658 may be repeated until an entire data transfer has been completed.

Although example embodiments have been described above, other variations and embodiments may be made from this disclosure without departing from the spirit and scope of these embodiments.

What is claimed is:

1. A system, comprising:

a first bus interface having a first number of egress lanes;

a second bus interface having a second number of egress lanes, wherein the first number of egress lanes is greater than the second number of egress lanes;

a second number of egress selectors, each egress selector having an output coupled to an input of one of a first number of egress memories and each egress selector having a plurality of inputs coupled to the first bus interface egress lanes wherein each egress selector may select any one of the first bus egress lanes to output to the input of the corresponding egress memory; and each egress memory having an output to transfer data to one of the second bus egress lanes, a read enable input coupled to a first finite state machine synchronized to a first clock, and a write enable input coupled to a second finite state machine synchronized to a second clock;

wherein the first finite state machine controls a select input of each of the egress selectors.

2. The system of claim 1, wherein the first bus interface is a Peripheral Component Interconnect Express (PCIe) bus interface and the second bus interface is an Advanced extensible Interface (AXI) bus interface.

3. The system of claim 1, comprising:

an egress descriptor memory to store header information, the egress descriptor memory having an input coupled to the first bus interface and an output; and a selector to select either the descriptor memory output or an egress memory output to pass to one of the egress lanes of the second bus interface.

4. The system of claim 1, comprising an egress descriptor memory to store packet information for egress bus transactions, the packet information comprising an indication of which of the egress memories contains valid data associated with a corresponding packet.

5. The system of claim 2, wherein the first finite state machine selects data from a first egress lane of the PCIe bus interface for delivery to the tenth egress memory destined for the tenth egress lane of the AXI bus.

6. The system of claim 2, wherein the first bus interface has 10 egress lanes and the second bus interface as 16 egress lanes.

7. The system of claim 2, wherein each output of the egress memories is coupled to one lane of the second bus interface.

8. A system, comprising:

a first bus interface having a first number of ingress lanes;

a second bus interface having a second number of ingress lanes, wherein the first number of ingress lanes is greater than the second number of ingress lanes;

a first number of ingress memories, each ingress memory having an input coupled to one of the ingress lanes of the first bus interface, an output, a read enable input coupled to a first finite state machine synchronized to a first clock, a write enable input coupled to a second finite state machine synchronized to a second clock; and a second number of ingress selectors, each ingress selector having an output coupled to one of the ingress lanes of the second bus interface, each ingress selector having a plurality of inputs including an input for each lane of the first ingress bus; and wherein the second finite state machine controls a select input of each of the plurality of ingress selectors.

9. The system of claim 8, wherein the first bus interface is a 16-lane AXI bus interface, the second bus interface is a 10-lane PCIe bus inter.

10. The system of claim 8, comprising:

an ingress descriptor memory to store header information, the ingress descriptor memory having an input coupled to the first bus interface and an output, wherein each of the second number of ingress selectors has an input coupled to the ingress descriptor memory output.

11. The system of claim 8, comprising an ingress descriptor memory to store packet information for ingress bus transactions, the packet information comprising an indication of which of the ingress memories contains valid data associated with a corresponding packet.

12. The system of claim 9, wherein the second finite state machine selects data from the eleventh ingress memory to output to the first ingress lane of the second bus interface.

13. A method, comprising:

at a first time synchronized with a first bus clock:

receiving a set of data units of a first ingress packet from a plurality of ingress lanes of a first bus, respective ones of the plurality of ingress lanes providing a respective one of the set of data units, storing each data unit in a respective ingress memory, the number of ingress memories equal to the number of the plurality of ingress lanes, writing a first descriptor to an ingress descriptor memory, the descriptor including an identification of valid data units in the received packet; and at a second time synchronized with a second bus clock:

reading the first descriptor from the ingress descriptor memory, and for each of a plurality of valid data units identified in the first descriptor:

select the ingress memory containing the respective valid data unit, route the respective valid data unit to one of a plurality of ingress lanes of a second bus, and assert a read enable on the ingress memory containing the respective valid data unit.

14. The method of claim 13, comprising:

determining the first descriptor identifies more valid data units than ingress lanes in the second bus and identifying remaining valid data units not transferred at the second time, and at a third time synchronized with the second bus clock:

for each of the remaining valid data units identified in the first descriptor:

select the ingress memory containing the respective valid data unit, route the respective valid data unit to one of the plurality of ingress lanes of a second bus, and assert a read enable on the ingress memory containing the respective valid data unit.

15. The method of claim 13, comprising writing an ingress header to an ingress lane of the second bus.

16. The method of claim 13, wherein each of the ingress memories is a strip of RAM memory.

17. The method of claim 14, wherein:

the first bus has a 16 lane bus interface, the second bus has a 10 bus interface, at the second time, the plurality of valid data units are transferred to the second bus, and at the third time, the remaining valid data units are transferred to six lanes of the second bus.

\* \* \* \* \*